United States Patent [19]
Buckhouse et al.

[11] 4,392,543
[45] Jul. 12, 1983

[54] HYDROSTATIC TRANSMISSION CONTROL

[75] Inventors: Norman O. Buckhouse, Kansasville, Wis.; Aaron A. Stevens, Spring Hill; Randall K. Lawrence, Fairview, both of Tenn.

[73] Assignee: The Murray Ohio Manufacturing Co., Brentwood, Tenn.

[21] Appl. No.: 238,624

[22] Filed: Feb. 26, 1981

[51] Int. Cl.³ .............................................. B60K 20/00
[52] U.S. Cl. ...................................... 180/272; 60/465; 180/273
[58] Field of Search ............... 180/272, 273; 192/3.56, 192/18 B, 0.055, 0.082; 74/531, 473 R; 200/61.88, 61.89; 188/161, 164; 60/465

[56] References Cited

U.S. PATENT DOCUMENTS

| | | | |
|---|---|---|---|
| 2,896,757 | 7/1959 | Palys | 192/3.56 |
| 2,945,100 | 7/1960 | Maurice et al. | 192/3.56 |
| 3,048,052 | 8/1962 | Chapman | 74/531 |
| 3,265,150 | 8/1966 | Westman | 180/273 |
| 3,539,040 | 11/1970 | Edwards | 188/265 |
| 3,756,356 | 9/1973 | Loyd, Jr. | 188/164 |
| 3,919,806 | 11/1975 | Pluenneke et al. | 47/1.3 |
| 3,999,643 | 12/1976 | Jones | 192/3.56 |
| 4,082,013 | 4/1978 | Dornfeld et al. | 192/4 B |
| 4,085,833 | 4/1978 | Papasideris | 74/866 |
| 4,192,399 | 3/1980 | Otteson et al. | 200/61.89 |

Primary Examiner—Joseph F. Peters, Jr.
Assistant Examiner—Kenneth R. Rice
Attorney, Agent, or Firm—Cushman, Darby & Cushman

[57] ABSTRACT

A speed control assembly is provided particularly for use in controlling the position of a hydrostatic transmission. An operator controlled lever is mounted for rotation about a shaft, and a portion of the lever is mounted for linear reciprocation with respect to the shaft. The shaft includes a disc cooperating with an annular electromagnet, the electromagnet when energized acting on the disc to latch the shaft so that it cannot be moved. When the control lever portion is reciprocated with respect to the shaft, the electromagnet is de-energized and the shaft may be rotated to act through a lever assembly to control the position of a hydrostatic transmission. Electric switches are mounted responsive to the driver's seat occupancy and to application of the brakes so that if the driver's seat is vacated or the brakes are applied the electromagnet is de-energized. When the electromagnet is de-energized, springs bias the control lever to a neutral position.

11 Claims, 4 Drawing Figures

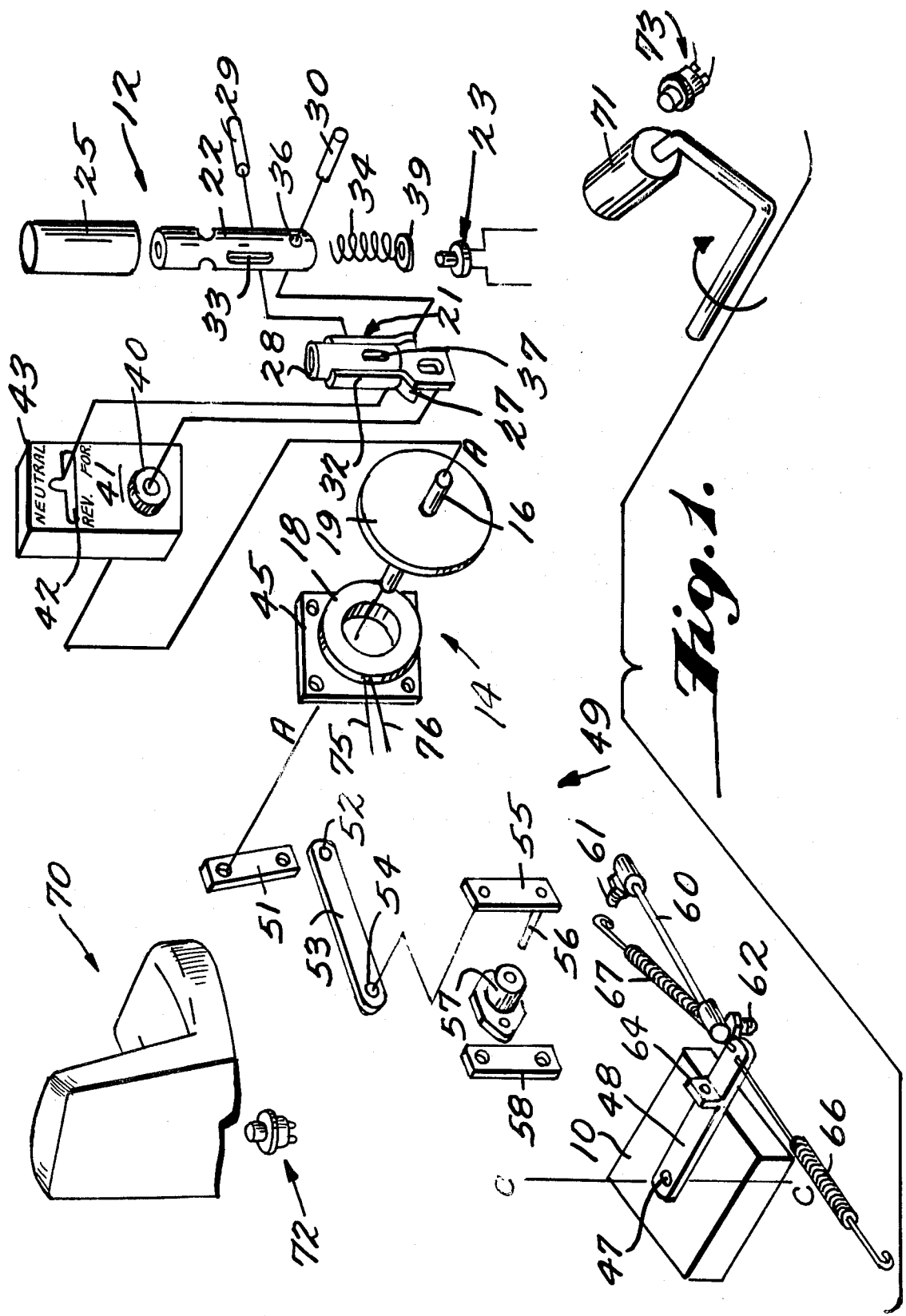

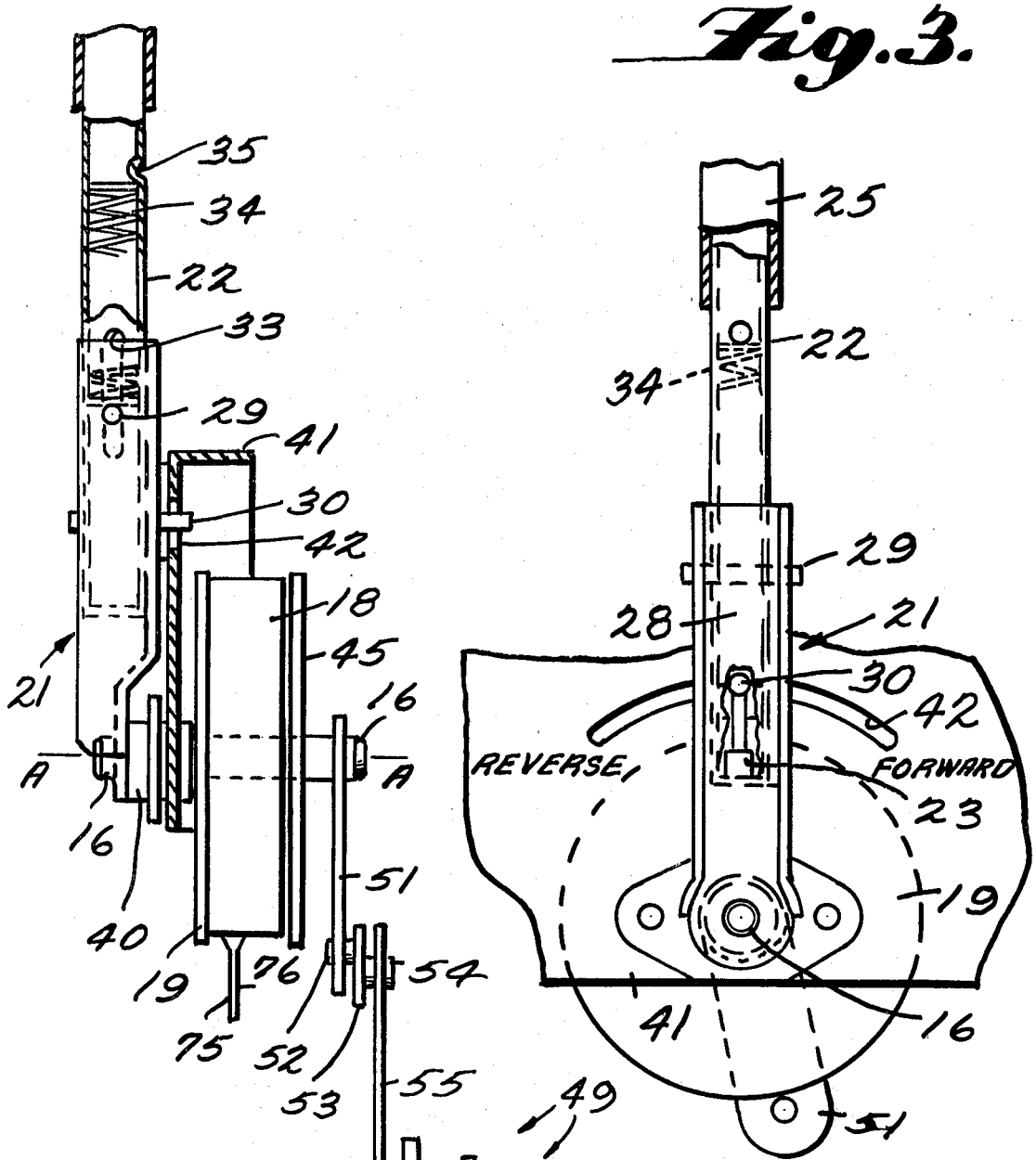
Fig. 3.
Fig. 2.
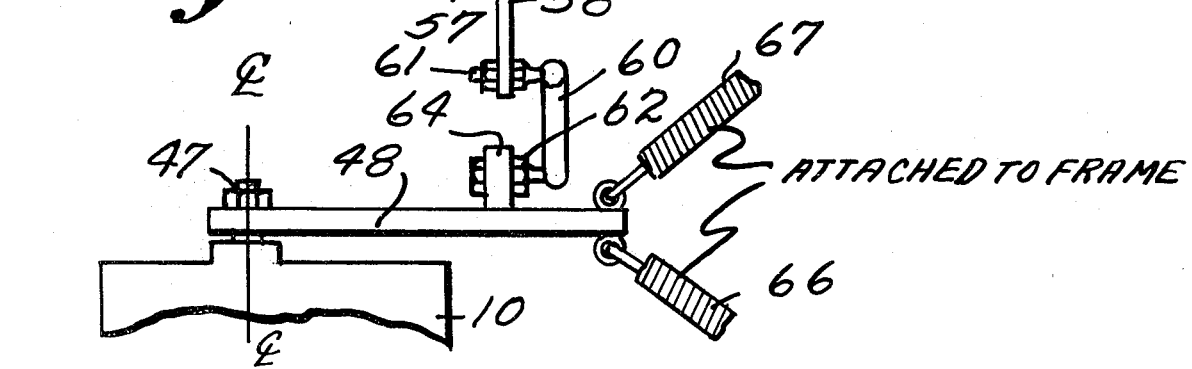

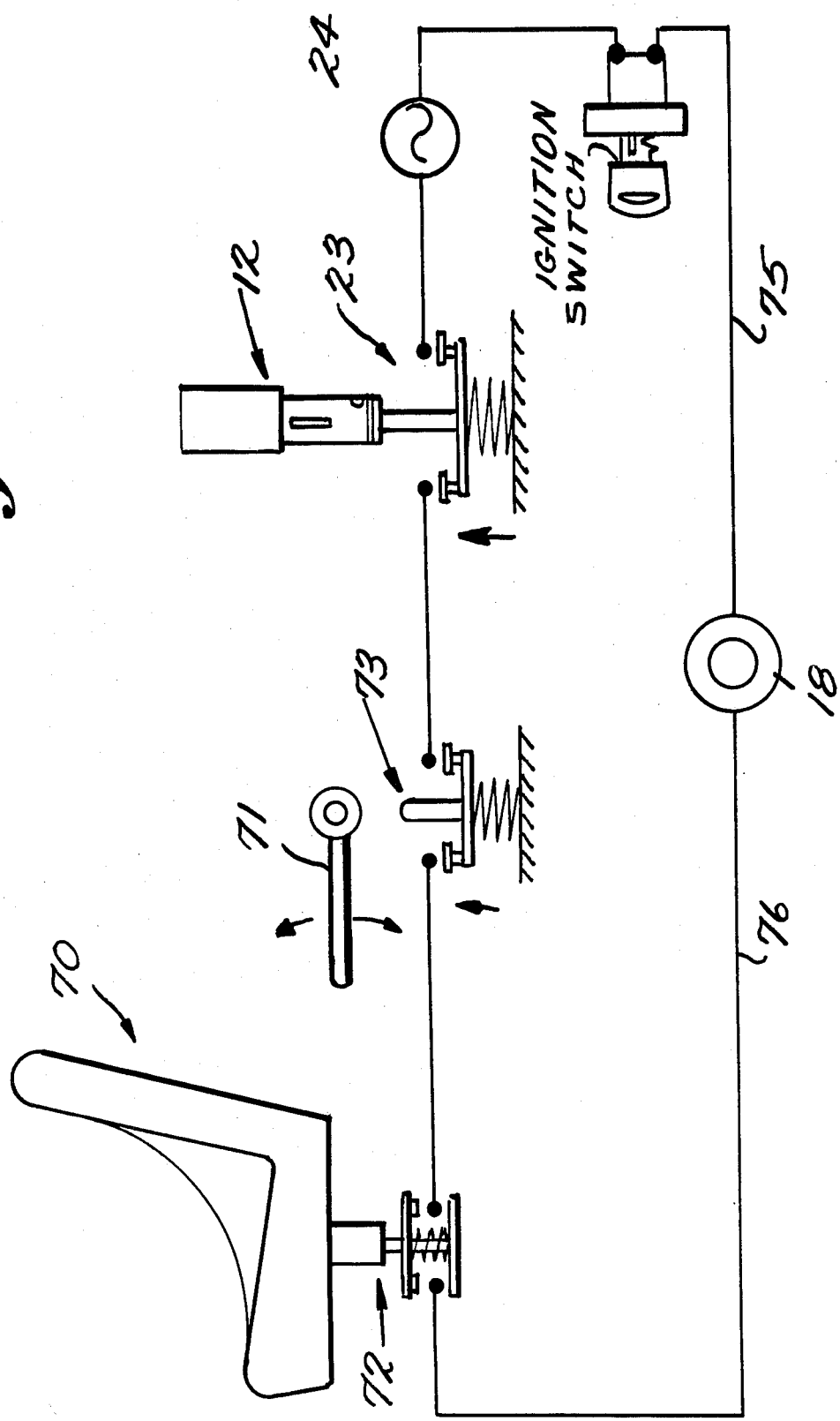

HYDROSTATIC TRANSMISSION CONTROL

BACKGROUND AND SUMMARY OF THE INVENTION

The invention relates to a speed control assembly for a motor or engine, in general, and more particularly to a control of a hydrostatic transmission of a motor vehicle. The control assembly according to the present invention is simple and conveniently operated, and the force required to effect control is relatively low. Additionally, the speed control provides in a simple manner for an infinite speed selection within its limits of travel, and for safety when utilized with a motor vehicle—the control assembly ensures automatic return to neutral when the brakes are applied or the driver's seat is vacated. The internal frictional drag of a hydrostatic unit is such that when in neutral it can bring a vehicle to approximate rest without brakes, and thus when the control assembly according to the present invention is utilized with a hydrostatic transmission it provides a further degree of safety.

According to one aspect of the present invention, a speed control assembly for a motor or engine is provided which includes a speed control lever, means for mounting the speed control lever for movement in a first mode to effect speed control of a motor or engine, and means for latching the speed control lever in a position to which it has been moved in the first mode of movement. The assembly further comprises means for mounting the speed control lever for movement in a second mode, different from the first mode, and means responsive to movement of the speed control lever in the second mode for effecting operation of the latching means to unlatch the speed control lever so that it can be moved in the first mode. An electromagnet is provided as the latching means so that the speed control lever can be positively latched in an infinite number of positions. An electric switch is responsive to movement of the control lever in the second mode, the switch being in series with the electromagnet and a power source, such as a vehicle alternator.

A shaft mounts the control lever for rotational movement, the rotational movement being the first mode, and a first portion of the control lever is affixed to the shaft while a second portion of the control lever is linearly reciprocal with respect to the shaft in a dimension perpendicular to the axis of rotation of the shaft, the linear reciprocation providing the second mode of movement of the control lever. The electromagnet preferably comprises an annular member disposed in a plane perpendicular to the shaft axis of rotation, and the latching means further comprises a disc mounted on the shaft for rotation therewith and disposed in a plane perpendicular to the shaft, and adjacent the electromagnet, so that the electromagnet—when energized—exerts a latching force on the disc to hold it in place.

According to another aspect of the present invention, a speed control assembly for a motorized vehicle having a driver's seat and brake means is provided. The assembly includes a hydrostatic transmission for controlling the speed of the vehicle, and having a neutral position; a control lever for actuating the hydrostatic transmission to move it out of and into the neutral position to effect speed control thereby; means for latching the speed control lever in a position to which it has been moved; and means for automatically unlatching the latching mean and returning the hydrostatic transmission to neutral position in response to vacating of the driver's seat by the driver, application of the brakes, or stopping the engine. The latching means comprises an electromagnet and a seat switch and brake switch are disposed in series with the electromagnet and the vehicle alternator to control operation of the electromagnet. Spring biasing means are provided for automatically returning the hydrostatic transmission to neutral.

According to a still further aspect of the present invention, an assembly is provided comprising a control lever operatively connected to a control mechanism for controlling the operation of the mechanism; a shaft connected to the control lever for movement therewith; means for mounting the shaft for rotation about a given axis; and a plate mounted to the shaft for rotation therewith. The assembly further comprises an electromagnet and means for mounting the electromagnet adjacent the plate so that when the electromagnet is energized it holds the plate and prevents rotation of the plate and shaft. The plate preferably comprises a disc disposed in a plane perpendicular to the shaft, and the electromagnet is annular. The shaft is mounted so that it is perpendicular to the plane of the annular electromagnet, and the disc is adjacent and parallel to the electromagnet. A lever means is mounted to the shaft on the opposite side of the electromagnet as the control lever, with the shaft extending through the opening in the annular electromagnet.

It is the primary object of the present invention to provide a simple, effective, and safe control assembly, particular for a hydrostatic transmission. This and other objects of the invention will become clear from an inspection of the detailed description of the invention, and from the appended claims.

BRIEF DESCRIPTION OF THE DRAWINGS

FIG. 1 is an exploded view showing an exemplary assembly according to the present invention;

FIG. 2 is a side view, partly in cross-section and partly in elevation, of the actual control components of the assembly of FIG. 1;

FIG. 3 is a front view, partly in cross-section and partly in elevation, of the control lever of FIG. 2, and related components; and FIG. 4 is an electrical schematic showing the electrical connections between component parts of the assembly of FIG. 1.

DETAILED DESCRIPTION OF THE DRAWINGS

The speed control assembly according to the present invention is most desirably for use with a hydrostatic transmission, indicated generally at 10 in FIGS. 1 and 2. The present invention primarily relates to a particular control mechanism for the hydrostatic transmission 10, the control mechanism including as basic components thereof a speed control lever—shown generally at 12 in the drawings—and latching means—shown generally at 14 in the drawings—for latching the speed control lever 12 in any position to which it has been moved to effect control of the hydrostatic transmission 10. It is to be understood that when used to control a hydrostatic transmission, the control assembly according to the present invention may also be utilized in conjunction with a brake lever and a range selector lever, and like conventional components of a vehicle having a hydrostatic transmission, such as shown generally in U.S. Pat.

No. 4,085,833 (the disclosure of which is hereby incorporated by reference herein).

The control lever 12 is mounted for movement in a first mode to effect its controlling function. Preferably this first mode is a rotational mode, and for this purpose the speed control lever 12 is mounted to a shaft 16 for rotation therewith. The latching means operatively acts upon the shaft 16 to latch it in place, the latching means preferably comprising an electromagnet 18 and a cooperating plate 19 attached to the shaft 16 on which the electromagnet 18 directly acts.

The speed control assembly according to the present invention further comprises means for mounting the speed control lever 12 for movement in a second mode, different from the first mode, and means responsive to movement of the speed control lever in the second mode for effecting operation of the latching means 14 to unlatch the speed control lever so that it can be moved in the first mode. The second mode of operation of the speed control lever 12 is preferably a linear reciprocal movement mode, generally perpendicular to the axis of rotation of shaft 16. The means for mounting the lever 12 for the second mode movement preferably comprises a first portion 21 of the speed control lever 12 which is affixed to the shaft 16, and a second portion 22 of the speed control lever 12 which is mounted for telescopic sliding movement with respect to the first portion 21. Preferably an electrical switch 23 is responsive to this linear reciprocal movement, and the electrical switch 23 is mounted in series with electromagnet 18 and a power source (such as the vehicle's alternator, 24—see FIG. 4) to effect deenergization of the electromagnet 18 in response to relative movement between the components 21, 22.

FIGS. 1 through 3 show the control lever 12 and latching means 14 in detail. The control lever 12 includes a grip 25 mounted to one end of the second control lever portion 22. Relative reciprocal movement between the components 21, 22 is provided by forming the first component 21 as a channel member 27 affixed to shaft 16 and supporting a tube 28, and providing the second component 22 having an outside diameter slightly less than the inside diameter of tube 28. Appropriate bias, and appropriate guidance of the relative movement, are provided by a pair of spiral pins 29, 30. Channel 27 in tube 28 includes aligned openings 32 (see FIG. 1) therein for receipt of the spiral pin 29, and control lever component 22 includes an elongated slot 33 formed therein through which the pin 29 extends. A coil spring 34 is mounted between a seat provided by a deformation 35 in control lever component 22, and the pin 29, to provide a biasing force normally biasing the control lever components to the position illustrated in FIGS. 2 and 3. The component 22 is movable with respect to the component 21 in the dimension B illustrated in FIGS. 2 and 3, against the bias of spring 34.

Spiral pin 30 is stationary with respect to control lever 22, being held in place by aligned openings 36 (see FIG. 1) in the walls of component 22. The spiral pin 30 is reciprocal in an elongated slot 37 (see FIGS. 1 and 3) formed in the second component 21. The electric switch 23 is mounted in the component 21, at the bottom of tubular portion 28 thereof (see FIG. 3) so that it will be engaged by a disc 39 mounted to the bottom of component 22 once the component 22 approaches the end of its travel in dimension B towards shaft 16.

The shaft 16 is mounted for rotation about axis A—A (see FIG. 2) by a bushing 40 or the like, which bushing 40 may in turn be mounted stationarily with respect to the vehicle by housing 41. Preferably, housing 41 includes a slot 42 therein, including a notch 43. Spiral pin 30 slides in slot 42, the slot 42 defining the ends of travel of the control lever 12, and when the pin 30 is received in the notch 43 the control lever 12 is positively located in a position corresponding to the neutral position of the hydrostatic transmission 10.

As illustrated in the drawings, the electromagnet 18 is preferably annular, and is mounted by plate 45 to the frame of the vehicle or the like. The shaft 16 extends through the opening in the annular electromagnet 18, and is connected to a lever means on the opposite side of electromagnet 18 as the disc 19. The disc 19 is perpendicular to the axis A—A, and parallel to the plane of the electromagnet 18, as most clearly illustrated in FIG. 2, so that the electromagnet 18 applies—when energized—a force holding plate 19 and preventing rotation thereof.

As is conventional, the hydrostatic transmission 10 is preferably actuated by a transmission operating shaft 37 (see FIG. 1) mounted for rotation about an axis C—C (see FIGS. 1 and 2), the shaft being connected to an actuating lever 48. The lever means operatively connected to shaft 16 are illustrated generally at 49 in FIGS. 1 and 2, and include actuating lever 48, and in general are provided to transform rotation of shaft 16 about axis A—A to rotation of shaft 47 about axis C—C.

In the preferred embodiment illustrated in the drawings, the lever means 49 includes a lever 51 affixed to shaft 16 at one end thereof for rotation with shaft 16, and pinned by pin 52 to link 53, which link 53 is pinned by pin 54 at the opposite end thereof to lever 55. Lever 55 is fixed to shaft 56 rotatable in bushing 57 (which bushing 57 is attached to the vehicle frame), the opposite end of shaft 56 being affixed to lever 58. Lever 58 is affixed to connecting rods 60, as by screw-threaded ball joint 61 of connector rod 60. The opposite end of connector rod 60 also comprises a screw-threaded ball joint portion 62, which is attached to flange 64 upstanding from actuating lever 48.

Spring biasing means, such as coil springs 66, 67, are attached to the actuating lever 48 (and at the opposite ends thereof to the frame of the vehicle) for providing biasing means to return the hydrostatic transmission 10 to neutral position whenever the latching provided by electromagnet 18 is interrupted. The action of springs 66, 67 will of course also act through the lever means 49 to return the control lever 12 to its neutral position when the electromagnet 18 is de-energized, and then the pin 30 will seat in notch 43.

The vehicle with which the assembly is associated includes a driver's seat 70 (see FIGS. 1 and 4), and a brake means, which includes a brake pedal 71 that is movable to apply the vehicle brakes. A seat electrical switch 72 is operatively mounted with respect to the driver's seat 70 so that the switch 72 is responsive to whether or not the driver's seat 70 is occupied. For instance, the switch 72 may be mounted so that it will be actuated when portions of the seat 70 deform in response to the driver's weight when the driver sits down on the seat 70. Brake switch means 73 are also responsive to the position of the brake pedal 71, so that when the brakes are applied the pedal 71 actuates the switch 73.

FIG. 4 illustrates the electrical interconnections between the various electrical components of the assembly according to the present invention. As illustrated, the switches 23, 72, and 73 are connected in series with vehicle alternator 24 and electromagnet 18. Preferably the switches 23, 73 are normally biased to the closed position so that when the brakes are not applied or the control lever is not moved in its second mode, the circuit between battery 24 and electromagnet 18 is completed. Preferably seat responsive switch 72 is biased so that it is normally open, and only when it is closed by the action of the driver sitting in the seat 70 will the circuit to electromagnet 18 be completed. Wires 75, 76 extend from electromagnet 18 to connect it to the opposite poles of the alternator 24, and in series with the switches 23, 72, 73, 77.

An apparatus according to the present invention having been described, an exemplary manner of operation thereof will now be set forth.

The operator of a vehicle containing hydrostatic transmission 10 sits down in the driver's seat 70, starts up the vehicle, and is ready to operate the vehicle. Since the vehicle is started and the operator is sitting in seat 70, switch 72 is actuated to complete the circuit to electromagnet 18, which holds disc 19 and thus prevents rotation of control lever 12. To effect movement of control lever 12, and thus effect movement and speed control of the vehicle, the operator pushes component 22 in dimension B toward the shaft 16, which causes the disc 39 to actuate switch 23 to de-energize electromagnet 18, and moves pin 30 out of notch 43 into slot 42. With electromagnet 18 deenergized, the driver may then move the control lever 12 to any one of the infinite number of positions between the range of movement defined by slot 42. Once the operator lets go of control lever 12 when it is in the desired position, component 22 moves out of actuating engagement with switch 23, again causing the electromagnet 18 to be energized so that the disc 19, attached to shaft 16, and attached control lever 12 are latched in place. The pivotal movement of control lever 12 effects rotation of shaft 16, which in turn effects movement of lever 51 which is transmitted to movement of link 53, lever 55, lever 58, and connecting rod 60, to ultimately effect pivotal movement of actuator lever 48 to rotate shaft 47 about axis C—C, thereby operating the hydrostatic transmission.

Should the operator apply the brakes of the vehicle, brake pedal 71 will actuate switch 73, which will break the circuit to electromagnet 18 so that the shaft 16 is no longer latched in position. Springs 66 and 67 then automatically return actuating lever 48 to a neutral position, which movement is transferred through the lever means 49 to the shaft 16, and automatically returns control lever 12 to its neutral position, with pin 30 being received by notch 43. Also, once the operator gets up from the driver's seat 70, switch 72 breaks the circuit to electromagnet 18, and again the transmission 10 and control lever 12 are returned to neutral position. When the ignition switch 77 is turned off the circuit to the electromagnet is also broken, or if the engine stops for any reason the alternator 24 no longer supplied power to the electromagnet, so that the transmission 10 and control lever 12 are returned to neutral position.

It will thus be seen that according to the present invention an assembly has been provided which allows convenient, simple, and safe control of a motor or engine, and particularly a hydrostatic transmission associated with a motor vehicle.

While the invention has been herein shown and described in what is presently conceived to be the most practical and preferred embodiment thereof, it will be apparent to those of ordinary skill in the art that many modifications may be made thereof within the scope of the invention, which scope is to be accorded the broadest interpretation of the appended claims so as to encompass all equivalent assemblies and devices.

What is claimed is:

1. A speed control assembly for a motor or engine comprising:
    a speed control lever;
    a shaft for mounting said speed control lever for movement about a given axis;
    means operatively connected to said shaft for effecting speed control of a motor or engine in response to rotation of said shaft;
    means for latching said speed control lever in an infinite number of positions to which it is moved by pivotal movement thereof about said axis, said latching means comprising an annular electromagnet disposed in a plane perpendicular to said shaft axis of rotation, and a disc mounted on said shaft for rotation therewith and disposed in a plane perpendicular to said shaft axis of rotation and adjacent said electromagnet, so that said electromagnet when energized exerts a latching force on said disc to hold it in place;
    means for mounting said speed control lever for movement in a mode different from said pivotal movement thereof about said axis; and
    electrical switch means connected in series with said electromagnet and responsive to movement of said speed control lever in said different mode for effecting de-energization of said electromagnet, and therefore unlatching of said control lever for pivotal movement about said axis, when said control lever is moved in said different mode.

2. An assembly as recited in claim 1 wherein said speed control lever has a neutral position, and further comprising spring biasing means operatively connected to said shaft for biasing said speed control lever to said neutral position.

3. An assembly as recited in claims 1 or 2 wherein said speed control lever includes a first portion thereof fixed to said shaft, and a second portion thereof movable with respect to said first portion, said means responsive to movement of said speed control lever in said different mode being responsive to movement of said second portion of said speed control lever with respect to said first portion.

4. An assembly as recited in claims 1 or 2 wherein said means for mounting said speed control lever for movement in a different mode comprises a first portion of said speed control lever affixed to said shaft, and a second portion of said speed control lever reciprocal with respect to said first portion, and including a spring biased pin mounted to said second portion of said speed control lever and extending through a slot formed in said first portion of said speed control lever for guided reciprocal movement therein, said pin extending parallel to said shaft; and wherein said assembly further comprises: a housing stationary with respect to said shaft; means defining an arcuate slot in said housing concentric with said shaft; and means defining a linear slot in said housing perpendicular to said shaft, said linear and arcuate slots receiving said pin therein.

5. A speed control assembly for a motorized vehicle, said assembly comprising:
    a hydrostatic transmission for controlling the speed of said vehicle, and including an actuating lever, and spring means acting directly on said actuating lever for spring biasing said actuating lever to a neutral position;

a control lever remote from said hydrostatic transmission and actuating lever therefor, said control lever mounted for pivotal movement about a given axis defined by a shaft;

means for mounting a portion of said control lever for reciprocal linear movement in a dimension generally perpendicular to said given axis;

means for latching said speed control lever in a position to which it has been pivoted about said given axis, said latching means comprising an annular electromagnet and mounted so that said shaft for mounting said control lever passes through the center thereof; a disc mounted on said shaft perpendicular thereto, and adjacent said electromagnet for operative cooperation with said electromagnet;

lever means operatively connected to said control lever shaft and to said transmission actuating lever for transforming rotation of said control lever shaft into pivotal movement of said transmission actuating lever; and electrical switch means in series with said electromagnet for effecting de-energization of said electromagnet, and thus unlatching of said speed control lever, in response to reciprocal movement of a portion of said speed control lever.

6. An assembly as recited in claim 5 wherein said reciprocal portion of said speed control lever comprises a pin extending substantially parallel to said shaft; and further comprising: a stationary housing portion; means defining an arcuate slot in said stationary housing portion, said slot concentric with said shaft; means defining a linear slot in said housing communicating with said arcuate slot, and extending perpendicular to said shaft; and a non-reciprocal portion of said speed control lever attached to said shaft and mounting said pin for reciprocal movement with respect thereto so that said pin extends outwardly therefrom into operative engagement with said linear and arcuate slots.

7. An assembly as recited in claim 6 wherein said electrical switch means is mounted inside said non-reciprocal control lever portion.

8. An assembly as recited in claims 5, 6, or 7 wherein said motorized vehicle has a driver's seat and brake means, and wherein said electromagnet, electrical switch means, and a power source are in series with a second electrical switch means operatively connected to said driver's seat and a third electrical switch means operatively associated with said brake means, so that in response to vacating of said driver's seat by the driver, or application of said brake means to brake said vehicle, the power to said electromagnet will be cut off, and said spring means will automatically return said hydrostatic transmission actuating lever and said control lever to neutral positions.

9. An assembly as recited in claim 8 further comprising an electrical ignition switch means for said motorized vehicle, said electrical ignition switch means in series with said power source and electromagnet so that when said electrical ignition switch means is open current to said electromagnet is terminated and said hydrostatic transmission actuating lever and said control lever automatically return to neutral positions.

10. An assembly as recited in claim 5 further comprising an electrical ignition switch means for said motorized vehicle, said electrical ignition switch means in series with a power source and electromagnet so that when said electrical ignition switch means is open current to said electromagnet is terminated and said hydrostatic transmission actuating lever and said control lever automatically return to neutral positions.

11. A speed control assembly for a motorized vehicle having a driver's seat, an electrical ignition switch, and brake means, said assembly comprising:

a hydrostatic transmission for controlling the speed of said vehicle, and having a neutral position;

a control lever for actuating said hydrostatic transmission to move it out of and into neutral position to effect speed control thereby;

means for latching said speed control lever in a position to which it has been moved; and means for automatically unlatching said latching means and returning said hydrostatis transmission to neutral position in response to vacating of said driver's seat by the driver, or application of said brake means to brake said vehicle, said automatic unlatching means comprising means for automatically unlatching said latching means and returning said hydrostatic transmission to neutral position in response to turning off of said electrical ignition switch, or in response to any other stoppage of the engine of said motorized vehicle.

* * * * *